United States Patent
Pellico

(10) Patent No.: US 8,205,602 B2
(45) Date of Patent: Jun. 26, 2012

(54) SYSTEM AND METHOD OF CONTROLLING AN AMOUNT OF CONDENSATION IN AN ENGINE AIR INTAKE SYSTEM

(75) Inventor: Christopher J. Pellico, Darien, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 343 days.

(21) Appl. No.: 12/611,418

(22) Filed: Nov. 3, 2009

(65) Prior Publication Data

US 2011/0099988 A1 May 5, 2011

(51) Int. Cl.
*F02B 47/08* (2006.01)
*F01N 3/02* (2006.01)
*F02M 25/07* (2006.01)

(52) U.S. Cl. ..................... 123/568.11; 60/309
(58) Field of Classification Search ................. 123/568; 60/309, 320
See application file for complete search history.

(56) References Cited

U.S. PATENT DOCUMENTS

| | | | | |
|---|---|---|---|---|
| 3,817,221 A * | 6/1974 | Nohira et al. | ............... | 123/25 Q |
| 4,055,158 A * | 10/1977 | Marsee | ............... | 123/568.12 |
| 6,301,887 B1 * | 10/2001 | Gorel et al. | ............... | 60/605.2 |
| 6,367,256 B1 * | 4/2002 | McKee | ............... | 60/605.2 |
| 7,530,336 B2 * | 5/2009 | Brecheisen, II | ............... | 123/25 A |
| 2004/0079079 A1 * | 4/2004 | Martin et al. | ............... | 60/605.2 |

* cited by examiner

*Primary Examiner* — Stephen K Cronin
*Assistant Examiner* — Sherman Manley
(74) *Attorney, Agent, or Firm* — Mark C. Bach; Jeffrey P. Calfa

(57) ABSTRACT

A condensation collection system for an internal combustion engine having an exhaust gas recirculation system comprises a condensation collection line, a condensation accumulator, and a condensation expulsion line. The condensation collection line is disposed in fluid communication with an air intake system of an internal combustion engine. The condensation accumulator is in fluid communication with the condensation collection line. The condensation collection line being disposed between the air intake system and the condensation accumulator. The condensation expulsion line is in fluid communication with the condensation accumulator. A portion of the condensation expulsion line is disposed in contact with an engine exhaust pipe. The condensation expulsion line has an opening to vent condensation to the atmosphere.

17 Claims, 1 Drawing Sheet

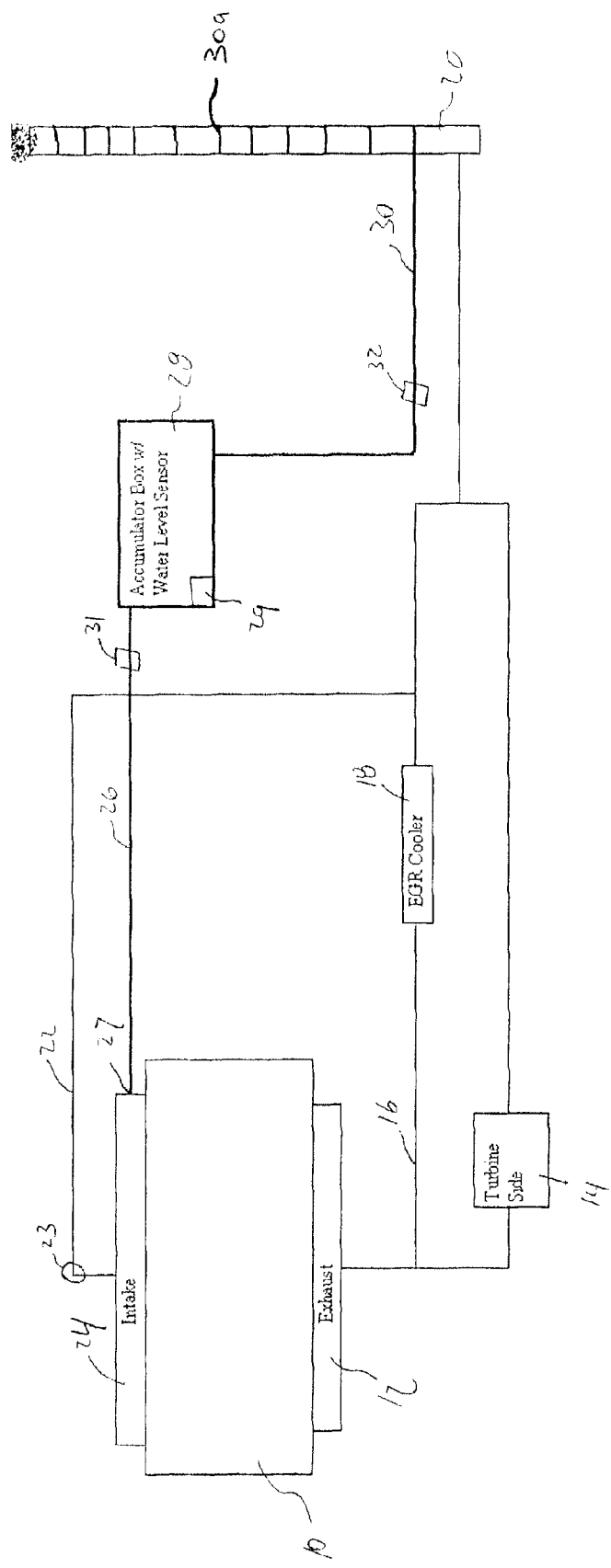

SYSTEM AND METHOD OF CONTROLLING AN AMOUNT OF CONDENSATION IN AN ENGINE AIR INTAKE SYSTEM

TECHNICAL FIELD

The present disclosure relates to a system for removing condensation from an air intake system of an engine, and more particularly to a system for removing condensation from the air intake system of the engine and venting the condensation to the atmosphere.

BACKGROUND

Many modern diesel engines have an exhaust system that features an exhaust gas recirculation ("EGR") system that routes a portion of engine exhaust gas into an air intake system, such that a mixture of fresh air and engine exhaust is supplied to a combustion chamber during engine operation. One element of engine exhaust from the combustion of diesel fuel is water vapor. Many times the EGR system additionally includes an EGR cooler that reduces the temperature of the exhaust gas in the EGR system, prior to mixing the exhaust gas with fresh air. However, as EGR levels have increased in order to meet more stringent environmental concerns and emissions requirements, formation of condensation within the air intake system, from the water generated vapor during combustion, has increased to a level that can be problematic. The increased level of condensation may cause damage to engine components, or may adversely affect combustion of fuel within the engine. Therefore, a need exists for a system to control an amount of condensation present within the air intake system.

SUMMARY

According to one embodiment, a condensation collection system for an internal combustion engine having an exhaust gas recirculation system comprises a condensation collection line, a condensation accumulator, and a condensation expulsion line. The condensation accumulator has an input port and an output port. The condensation collection line has a condensation collection inlet and a condensation collection outlet. The condensation collection inlet is coupled to an air intake system of an internal combustion engine. The condensation collection outlet is coupled to the input port of the condensation accumulator. The condensation expulsion line is coupled to the output port of the condensation accumulator. A portion of the condensation expulsion line is disposed in contact with an engine exhaust pipe. The condensation expulsion line has an outlet to expel condensation from the system.

According to one process, a method of removing condensation from an air intake system of an internal combustion engine having an exhaust gas recirculation system is provided. Condensation transfers from the air intake system to a condensation accumulator through a condensation collection line. The condensation collection line is disposed in fluid communication with air intake system and the condensation accumulator. A predetermined amount of condensation is collected within the condensation accumulator. Condensation is expelled from the condensation accumulator through the condensation expulsion line coupled to the condensation accumulator.

According to another embodiment, an internal combustion engine comprises an air intake system, an exhaust system, a condensation sensor, a condensation collection line, a condensation accumulator, and a condensation expulsion line. The exhaust system has an exhaust gas recirculation system and an exhaust pipe. The exhaust gas recirculation system is in fluid communication with the air intake system. The condensation sensor is disposed within the air intake system. The condensation accumulator has an input port and an output port. The condensation collection line has a condensation collection inlet and a condensation collection outlet. The condensation collection inlet is coupled to an air intake system of an internal combustion engine. The condensation collection outlet is coupled to the input port of the condensation accumulator. The condensation expulsion line is coupled to the output port of the condensation accumulator. The condensation expulsion line is disposed in fluid communication with the atmosphere.

BRIEF DESCRIPTION OF THE DRAWINGS

FIG. 1 is a schematic diagram showing an engine having an exhaust system with an EGR system and an air intake system with a condensation controlling system.

DETAILED DESCRIPTION

FIG. 1 shows an engine 10 having an exhaust system 12. The exhaust system 12 comprises a turbine 14, such as for a turbocharger, and an EGR system 16. The EGR system 16 has an EGR cooler 18 that reduces the temperature of exhaust within the EGR system 16. The exhaust system 12 additionally comprises an exhaust pipe 20 that releases exhaust gas from the exhaust system 12 into the atmosphere. The exhaust gas that enters the exhaust pipe 20 has typically passed through the turbine 14. Exhaust gas that enters the exhaust pipe 20 may have passed through the EGR cooler 18 in certain engine operating conditions when EGR is not required.

The EGR system 16 additionally comprises an EGR connection 22 that delivers exhaust from the EGR system 16 to an air intake system 24. The air intake system 24 delivers fresh air as well as exhaust gas that has passed through the EGR cooler 18 to the engine 10 for use during combustion. The air intake system 24 includes fresh air delivery lines (not shown) that provide fresh air to the engine 10 that may be mixed with the exhaust gas from the EGR system 16. The air intake system 24 additionally has a condensation collection line 26. The condensation collection line 26 has a condensation collection inlet and a condensation collection outlet. The condensation collection inlet of the condensation collection line 26 connects to air intake system 24. The condensation collection outlet connects to a condensation accumulator 28. The condensation accumulator 28 has an input port and an output port. The input port of the condensation accumulator 28 connects to the condensation collection line 26. It is contemplated that a condensation control valve 27 may be positioned near the condensation collection inlet of the condensation collection line 26.

It is further contemplated that a condensation sensor 23 may be disposed in fluid communication with the EGR connection 22. The condensation sensor 23 measures an amount of condensation within the EGR connection 22, and may be used in controlling the opening and closing of the condensation control valve 27, such that the condensation control valve 27 is opened when the condensation sensor 23 detects high levels of condensation within the EGR connection 22. It is contemplated that the condensation sensor 23 may also be a humidity sensor, such that an estimate of condensation within the EGR connection 22 may be generated to control the opening and closing of the condensation control valve 27.

The condensation accumulator 28 collects condensation that has passed from the air intake system 24 via the condensation collection line 26. The condensation accumulator 28 additionally contains a fluid level sensor 29 that monitors the amount of condensation within the condensation accumulator 28. Once the fluid level sensor 29 determines that a predetermined amount of condensation is present within the condensation accumulator 28, condensation is allowed to flow into the condensation expulsion line 30. The condensation expulsion line 30 runs from the output port of the condensation accumulator 28 to the exhaust pipe 20. A coiled portion 30*a* of the condensation expulsion line 30 traverses a portion of the a perimeter of the exhaust pipe, such that the coiled portion 30*a* may be circumferentially coiled about the exhaust pipe 20. Heat from the exhaust pipe 20 is transferred to the condensation expulsion line 30 form the proximity of the condensation expulsion line 30 to the exhaust pipe 20. The heat from the exhaust pipe 20 causes the liquid within the condensation expulsion line 30 to transform to a vapor. The vapor from the condensation expulsion line 30 is then expelled, such as through venting. to the atmosphere from an outlet provided at a distal end of the condensation expulsion line 30.

It is further contemplated that a filter 31 may be provided in the condensation collection line 26, such that particulate matter within the condensation may be removed from the condensation prior to the condensation entering the condensation accumulator 28.

It is additionally contemplated that a filter 32 may be placed in the condensation expulsion line 30 to remove particulate matter within the condensation prior to the condensation being vented to the atmosphere. The filter 32 within the condensation expulsion line 30 may be provided in place of the filter 31 within the condensation collection line 26, or the filter 32 in the condensation expulsion line 30 may be provided in addition to the filter 31 within the condensation collection line 26. The removal of particulate matter within the condensation by the filer/filters 31, 32 reduces the emissions of the engine 10 that reach the atmosphere, and may increase the longevity of the condensation accumulator 28. It is contemplated that the filter 31 be located along the condensation collection line 26 in a location that allows access such that the filter 31 may be periodically serviced or replaced. Similarly, it is contemplated that the filter 32 be located along the condensation expulsion line 30 in a location that allows access such that the filter 32 may be periodically serviced or replaced.

What is claimed is:

1. A condensation collection system for an internal combustion engine having an exhaust gas recirculation system, the condensation collection system comprising:
    a condensation accumulator having an input port and an output port;
    a condensation collection line having a condensation collection inlet and a condensation collection outlet, the condensation collection inlet being coupled to an air intake system of an internal combustion engine, the condensation collection outlet being coupled to the input port of the condensation accumulator;
    a condensation expulsion line coupled to the output port of the condensation accumulator, a portion of the condensation expulsion line being disposed in contact with an engine exhaust pipe, the condensation expulsion line having an outlet provided to expel condensation from the system; and
    a condensation control valve moveable between an open position and a closed position, the condensation control valve being disposed within the air intake system and being configured to control condensation flow to the condensation collection line.

2. The condensation collection system of claim 1 further comprising a fluid level sensor disposed in the condensation accumulator.

3. The condensation collection system of claim 1 further comprising a filter disposed in the condensation collection line.

4. The condensation collection system of claim 1 further comprising a filter disposed in the condensation expulsion line.

5. The condensation collection system of claim 1, wherein at least a portion of the condensation expulsion line in contact with the engine exhaust pipe traverses a perimeter of the engine exhaust pipe.

6. The condensation collection system of claim 1 further comprising a condensation sensor disposed in the air intake system, the condensation sensor being configured to generate an output signal indicative of a level of condensation within the air intake system.

7. The condensation collection system of claim 6, wherein the condensation sensor is configured to set the condensation control valve between the open position and the closed position.

8. A method of removing condensation from an air intake system of an internal combustion engine having an exhaust gas recirculation system, the method comprising:
    transferring condensation from the air intake system to a condensation accumulator through a condensation collection line, the condensation collection line being disposed in fluid communication with the air intake system and the condensation accumulator;
    collecting a predetermined amount of condensation within the condensation accumulator;
    expelling condensation from the condensation accumulator through a condensation expulsion line coupled to the condensation accumulator; and
    heating the condensation within the condensation expulsion line to form vapor within the condensation expulsion line prior to expelling the condensation to the atmosphere.

9. The method of claim 8 further comprising:
    monitoring a level of condensation within the air intake system with a condensation sensor; and
    opening a condensation control valve when the condensation within the air intake system is above a predetermined value, the condensation control valve controlling fluid communication between the condensation collection line and the air intake system.

10. The method of claim 9, wherein the heating of the condensation within the condensation expulsion line is performed by an exhaust pipe.

11. The method of claim 10, wherein a portion of the condensation expulsion line is traverses at least a portion of a perimeter of the exhaust pipe.

12. The method of claim 8 further comprising filtering the condensation within the condensation collection line prior to collecting the condensation in the condensation accumulator.

13. The method of claim 8 further comprising filtering the condensation within the condensation expulsion line prior to expelling the condensation.

14. The method of claim 13, wherein the filtering removes particulate matter from the condensation.

15. An internal combustion engine comprising:
    an air intake system;

an exhaust system having an exhaust gas recirculation system, and an exhaust pipe, the exhaust gas recirculation system being in fluid communication with the air intake system;

a condensation sensor being disposed within the air intake system;

a condensation accumulator having an input port and an output port;

a condensation collection line having a condensation collection inlet and a condensation collection outlet, the condensation collection inlet being coupled to the air intake system and the condensation collection outlet being coupled to the input port of the condensation accumulator;

a condensation expulsion line being coupled to the outlet port of the condensation accumulator and being disposed in fluid communication with the atmosphere; and a condensation control valve being disposed between the air intake system and the condensation collection inlet of the condensation collection line, the condensation control valve having an open position allowing condensation to enter the condensation collection line from the air intake system and the condensation control valve having a closed position preventing condensation from entering the condensation collection line.

16. The internal combustion engine of claim 15 further comprising at least one filter, the at least one filter being disposed in at least one of the condensation collection line and the condensation expulsion line.

17. The internal combustion engine of claim 15, wherein at least a portion of the condensation expulsion line being disposed in contact with the exhaust pipe.

* * * * *